United States Patent [19]
Heins et al.

[11] Patent Number: 5,662,802
[45] Date of Patent: Sep. 2, 1997

[54] SOLVENT EXTRACTION PROCESS USING WATER ABSORBING SOLVENT AT PRESELECTED TEMPERATURE

[75] Inventors: William F. Heins, Redmond; James C. Nowak, Bellevue, both of Wash.

[73] Assignee: Ionics, Incorporated, Watertown, Mass.

[21] Appl. No.: 272,886

[22] Filed: Jul. 7, 1994

[51] Int. Cl.$^6$ .................. B01D 11/02; B01D 11/04
[52] U.S. Cl. .................. 210/634; 134/26; 134/40; 210/739; 210/774; 210/804
[58] Field of Search .................. 210/634, 774, 210/908, 909, 739, 772, 804, 639, 638, 800; 134/25.1, 26, 40

[56] References Cited

U.S. PATENT DOCUMENTS

| | | |
|---|---|---|
| 3,088,909 | 5/1963 | Davison et al. |
| 3,177,139 | 4/1965 | Kimberlin et al. |
| 3,899,419 | 8/1975 | Emanuel . |
| 3,925,201 | 12/1975 | Ames . |
| 4,002,562 | 1/1977 | Ames et al. |
| 4,056,466 | 11/1977 | Peters . |
| 4,177,038 | 12/1979 | Biebricher et al. |
| 4,405,448 | 9/1983 | Googin et al. |
| 4,421,649 | 12/1983 | Giskehaug et al. ........... 210/634 |
| 4,662,948 | 5/1987 | Weitzman ............... 134/25.1 |
| 4,801,384 | 1/1989 | Steiner .................. 210/634 |
| 4,830,754 | 5/1989 | Nowak et al. ............. 210/639 |
| 4,863,607 | 9/1989 | Andrew et al. ............ 210/634 |
| 4,869,825 | 9/1989 | Steiner .................. 210/634 |
| 4,952,315 | 8/1990 | Saab .................... 210/610 |
| 4,975,198 | 12/1990 | Steiner .................. 210/634 |
| 5,047,153 | 9/1991 | Nowak et al. ............ 210/634 |
| 5,051,030 | 9/1991 | Saha et al. .............. 210/908 |
| 5,055,196 | 10/1991 | Darian et al. ............ 210/638 |
| 5,057,222 | 10/1991 | Braden .................. 210/634 |
| 5,096,600 | 3/1992 | Hoch .................... 210/908 |
| 5,154,831 | 10/1992 | Darian et al. ............ 210/639 |
| 5,296,040 | 3/1994 | Dybus et al. ............. 134/40 |
| 5,340,406 | 8/1994 | Fearon .................. 210/634 |
| 5,453,133 | 9/1995 | Sparks et al. ............ 134/40 |
| 5,507,953 | 4/1996 | Machlitt et al. .......... 210/634 |
| 5,518,621 | 5/1996 | Holcombe et al. ......... 210/634 |

FOREIGN PATENT DOCUMENTS

| | | |
|---|---|---|
| 1077684 | 8/1967 | United Kingdom . |
| 1185454 | 3/1970 | United Kingdom . |

*Primary Examiner*—Joseph W. Drodge
*Attorney, Agent, or Firm*—R. Reams Goodloe, Jr.

[57] ABSTRACT

A method for enhancing solvent extraction of organic wastes from contaminated waste mixtures. A contaminated waste mixture is contacted with a solvent with high driving force for solvation of water, and most preferably with a solvent which is both anhydrous and which has an appreciable affinity for solvation of water. While the solvent is in contact with the contaminated waste mixture, a portion of the organic waste is dissolved in the solvent. Then, the solvated organic waste and residual solvent is removed from the contaminated waste mixture. Solvent is recovered, preferably by distillation, and is then dehydrated, prior to repeating the cycle. The technique substantially improves the degree of removal of certain organic wastes from contaminated waste mixtures, and has been demonstrated to be particularly useful for removal of pesticides from organic waste mixtures.

24 Claims, 4 Drawing Sheets

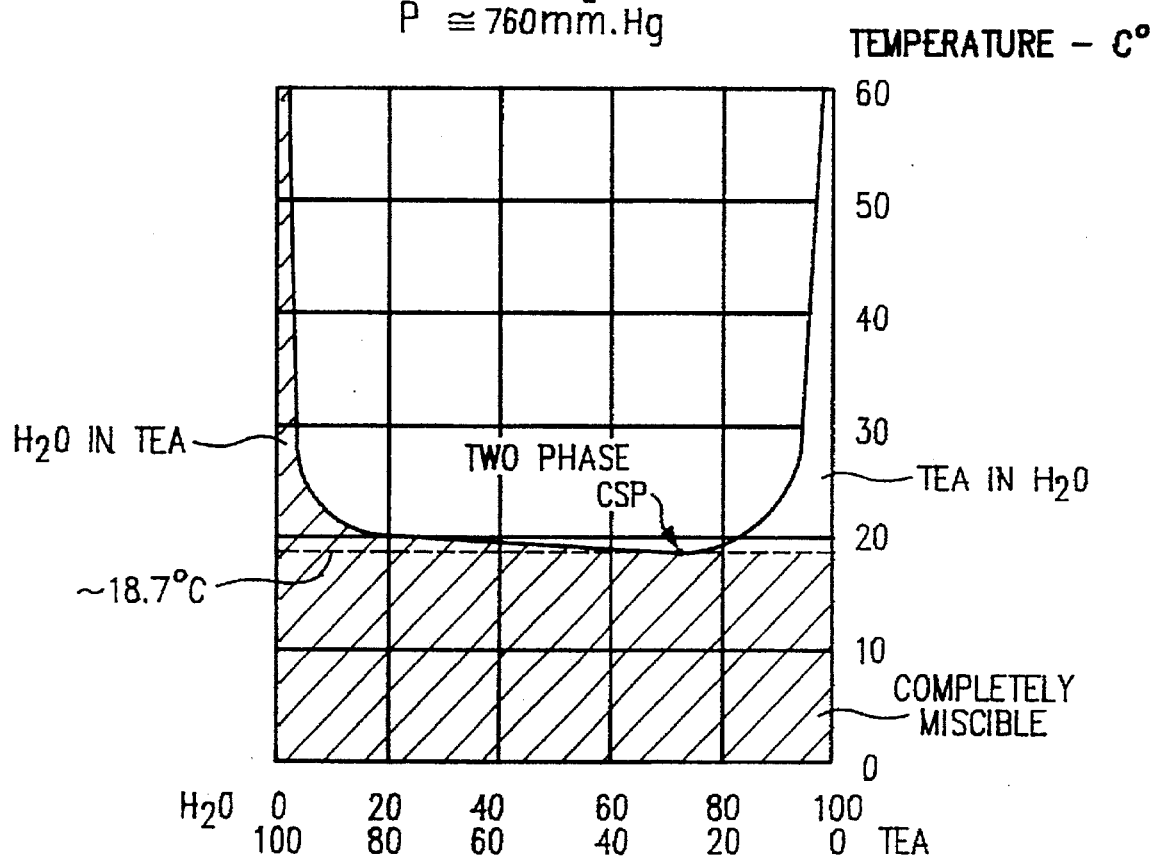

SOLVENT EXTRACTION PROCESS USING WATER ABSORBING SOLVENT AT PRESELECTED TEMPERATURE

FIELD OF THE INVENTION

This invention relates to the removal of contaminants such as pesticides from contaminated media, especially in the process of environmental remediation.

BACKGROUND OF THE INVENTION

Many industrial operations such as refineries, steel mills, chemical factories, electrical distribution, and other operations result in the formation of by-products consisting of oily liquids, or organic contaminated sludges, sediments, soils, and solids. The aforementioned oily liquids, oily sludges, and organic contaminated sludges, soils, and solids, comprise various mixtures of oils (including a multitude of oily organic compounds) and water. These oily and organic matter containing wastes have been found to be environmentally damaging and in many cases—notably when the contaminant includes pesticides or polychlorinated biphenyls (PCBs)—is dangerous to human health. The aforementioned oily and organic material containing wastes have proven difficult and expensive to separate into components. They have also proven difficult to remove the undesirable components or to render them environmentally acceptable. In consequence, in the past, the oily and organic material containing wastes were often simply impounded in ever enlarging ponds, lagoons, or dumps. Many such contaminated sites now exist, are deemed hazardous and undesirable, and Environmental Protection Agency regulations require their clean-up. Clearly, there exists a requirement for an oil and organic material waste treatment procedure which is both effective and economical.

A large number of techniques have been proposed, tried, and even patented to deal with the above described problem. These techniques may be divided into various types. One of the most favored technique types is incineration. Another highly favored technique type is solvent extraction. Both of these technique types have been classified by the Environmental Protection Agency as Best Available Technology (BAT).

The present invention consists of an improvement to solvent extraction methods. The improvement is particularly advantageous when practicing a hot solvent extraction, wherein the oily or organic material contaminated soil, sludge, or liquid is extracted with a solvent at temperatures above about 100° F., with the solvent at that temperature possessing a limited solvent capability for water. Hot solvent extraction is frequently used for final cleaning of organic material contaminated solids which have been dewatered and partially organic material extracted by the B.E.S.T.(R) solvent extraction process. The B.E.S.T. process is described in U.S. Pat. No. 3,899,419, issued to Emmanual, the disclosure of which is incorporated herein by reference. Improvements on the Emanual process are disclosed in U.S. Pat. No. 3,925,201 to Ames, U.S. Pat. No. 4,056,466 to Peters, U.S. Pat. No. 4,830,754 to Nowak et al, and U.S. Pat. No. 5,047,153 to Nowak et al, each of which is incorporated, in its entirety, by reference.

The B.E.S.T. process consists of:

1) mixing the oily waste to be treated with an adequate amount of solvent having an inverse critical solution temperature such as triethylamine at a temperature below the inverse critical solution temperature (15.5° for triethylamine). The oily material, water, and solvent will form one homogeneous liquid phase.

2) Separating the solid phase (if one exists) from the liquid phase which contains the oily material, water, and solvent.

3) Heating the liquid phase above the inverse critical solution temperature of the solvent. Two phases will form—a water phase in which a small amount of solvent is soluble—and a solvent phase in which the oily material is soluble along with a small amount of dissolved water (about 2% at 60° C. for triethylamine).

4) Separating the water phase by stripping and recovering the solvent. The water can be discharged.

5) Purifying the water phase by stripping and recovering the solvent. The water can be discharged.

6) Separating the oily material from the solvent phase, usually by distilling the solvent away. The oily material can be reused, incinerated, or otherwise treated. The solvent is reused. The solvent, unless specially treated, will contain the water which was dissolved in the solvent phase.

7) The solid can be dried to recover solvent and discharged if sufficiently cleaned of the oily or organic material contaminant. If more oily contaminant must be removed, the solid is treated again with solvent using a Hot Solvent Extraction process. However, in this solvent treatment step hot solvent (above the inverse critical solution temperature) is used since essentially all the original water has been separated from the solid and since solubility of the oily material in the solvent is enhanced at high temperature.

The B.E.S.T. process described above works well to achieve its purpose of dewatering and removing oily or organic material contaminant material from oily wastes. However, problems sometimes occur in the subsequent solid cleanup using the hot solvent extraction process (Step 7 above), especially with clay or clay-like or clay containing solids. Solids separated from the cold extraction (below the inverse critical solution temperature) are mixed with hot solvent (above about 100° F.) in the hot solvent extraction process (Step 7 above), especially with clay or clay-like or clay containing solids. When the solids separated from the cold extraction (below the inverse critical solution temperature) are mixed with hot solvent (above about 100° F.) in the hot solvent extraction Process, agglomeration of the solids occurs and either a sticky, doughy mass or a multitude of hard spheres about the size of small peas to marbles is formed. Mixing and handling of the solids becomes difficult, power requirements are increased as is equipment strength requirements, and extraction efficiency is reduced. Solids of similar characteristics (clay, clay-like or clay containing solids which are oil or organic material contaminated and containing water in amounts from about 1% to about 50%) produced by treatment processes other than B.E.S.T. or naturally occurring react in the manner described above when treated by the hot solvent extraction process and present the problems described above.

Clearly, a method is needed to prevent agglomeration of solids and to prevent loss of extraction of oily or organic containing material from solids during the aforesaid hot extraction steps of the B.E.S.T. process.

OBJECTS AND SUMMARY OF THE INVENTION

It is an object of the present invention to provide a method for controlling agglomeration of solids during hot solvent extraction of oily or organic materials from oily or organic material containing sludges, oily or organic material containing solids, and oily or organic material containing soils where the extraction solvent is a solvent possessing some but limited solvent capacity for water; the desired range of water solubility being ½ to 15% and a preferred range of water solubility being 1 to 5%, and the temperature of the solvent is above about 100° F. and preferably about 130° F. and where the temperature is above the inverse critical solution temperature of the solvent, if such inverse critical solution temperature exists.

It is a further object of the present invention to improve to lower levels the oily or organic material content of multiply extracted solids when hot solvent extracting oily or organic material containing sludges, oily or organic material containing solids, and oily or organic material containing soils with a solvent possessing some but a limited solvent capacity for water, the desired range of water solubility being ½ to 15%, and a preferred range of water solubility being 1 to 5%, and the solvent is at a temperature above 100° F. and preferably above 130° F. and the solvent is above the inverse critical solution temperature of the solvent, if such exists.

Briefly stated, one embodiment of the present invention provides a method for prevention of agglomeration of solids from oily or organic material containing oily or organic material containing solids, and oily or organic material containing soils (which may have been previously dewatered and partially deoiled by solvent extraction) and wherein said solids are now being mixed for oil or organic material with a hot extraction solvent possessing some but limited solvent hot capacity for water (range ½ to 15% and preferred range 1 to 5%) and the temperature is above 100° F. and preferably above 130° F., and where the temperature is above the inverse critical solution temperature of the solvent, if such exists, by using a sufficient quantity and water content of solvent such that all the water content of the solid is absorbed by the solvent and no free water is left in or on the solid, the result being a prevention of agglomeration of said solids.

In another embodiment, the present invention provides a method to reduce to very low levels the oily or organic material content of solids from oily or organic material containing sludges, or organic material containing solids, and oily or organic material containing soils which have been previously dewatered and partially decontaminated by solvent extraction and wherein said solids are now being mixed for further oil or organic material extraction with a solvent having some but a limited solvent capacity for water, the desired range of water solubility being ½ to 15% and the preferred range being 1 to 5%, and at a temperature above 100° F. and preferably above 130° F., and where the solvent is above the inverse critical solution temperature of the solvent if such inverse temperature exists, by using essentially dry solvent (i.e., solvent substantially free of water) rather than the commonly used solvent having an equilibrium content of water, regardless of whether the solids tend to agglomerate or not.

In yet another embodiment the present invention provides a method for controlling the rate of settling of solids form oily or organic material containing sludge, oily or organic material containing solids, and oily or organic material containing soils which have been previously dewatered and partially decontaminated by solvent extractions and wherein said solids are now, for further oil or organic material extraction, being mixed with a solvent having some but a limited solvent capacity for water and at a temperature of 100° F. or above, and where the temperature is above the inverse critical solution temperature, if such exists, and wherein the solvent is essentially dry (i.e., substantially free of water) by adding an effective amount of water to the mixture when settling of the solids is desired thus causing partial agglomeration of the solids, the degree of agglomeration being controlled by the amount of water added and the desired rate and amount of settling thereby achieved. In addition, the above described embodiments of the present invention provides a method for control of dusting of the final dried solids product by adjusting the amount of water added to the dry solvent-solids mixture during settling of the solids.

BRIEF DESCRIPTION OF THE DRAWINGS

FIG. 4 is a solubility diagram for triethylamine-water. Triethylamine is one solvent among many, of the type which can be used for the process of the present invention. The limited water solubility is shown.

DETAILED DESCRIPTION OF THE INVENTION

The present invention discloses, in a first embodiment, a process for controlling and preventing the agglomeration of oily or organic material containing solids particularly clay or clayey solids, which have been dewatered and partially decontaminated when said oily or organic material containing solids are treated with a solvent having some but limited solvent capacity for water in the range of ½ to 15% and preferably 1 to 5% and at temperatures above 100° F. and preferably above 130° F. to further reduce the oil or organic matter content. This aspect of the invention is represented at points 2 and 3 of FIG. 2 controlling and preventing agglomeration of said solids results in greater efficiency in solvent extraction of the organic compounds, a reduction in the power required for mixing, and easier handling of the solvent solid mixture. The desired result described above is achieved by using an adequate amount of solvent such that, accounting for the water content of the solvent and the absorbed and retained water content of the solid, all of the absorbed and retained water content of the solid is taken up by the solvent thus drying the solids, and rendering them non-agglomerating. The solvent can now extract oil and organic matter from the solid unimpeded by the physical barriers of agglomerated and wet solid particles.

Of course, if the solvent contains the equilibrium amount of water, in other words is saturated with water at the temperature of operation, no drying of the solids can take place and agglomeration is unimpeded. Most commercial grade solvents and most recycled solvents from solvent extraction operations are at or nearly saturated with water and thus cannot be used for the process of the present invention. However, many solvents of the limited water solubility type described above, can be rendered dry by simple fractional distillation and thus would be suitable for the process of the present invention. Among these solvents are the aliphatic amine solvents, particularly solvents such case triethylamine. "Dry" solvents usually contain no more than 0.2% water by weight.

As a practical matter, dry solvents are used in practicing the present invention. The amount of solvent is adjusted to achieve the prevention of agglomeration desired. The process of the present invention may be repeated multiple times in order to reduce the oil or organic matter content of the solids to as low as a level as possible, and such multiple repetitions are facilitated due to the prevention of solid agglomeration occasioned by the present invention.

Figure 1:
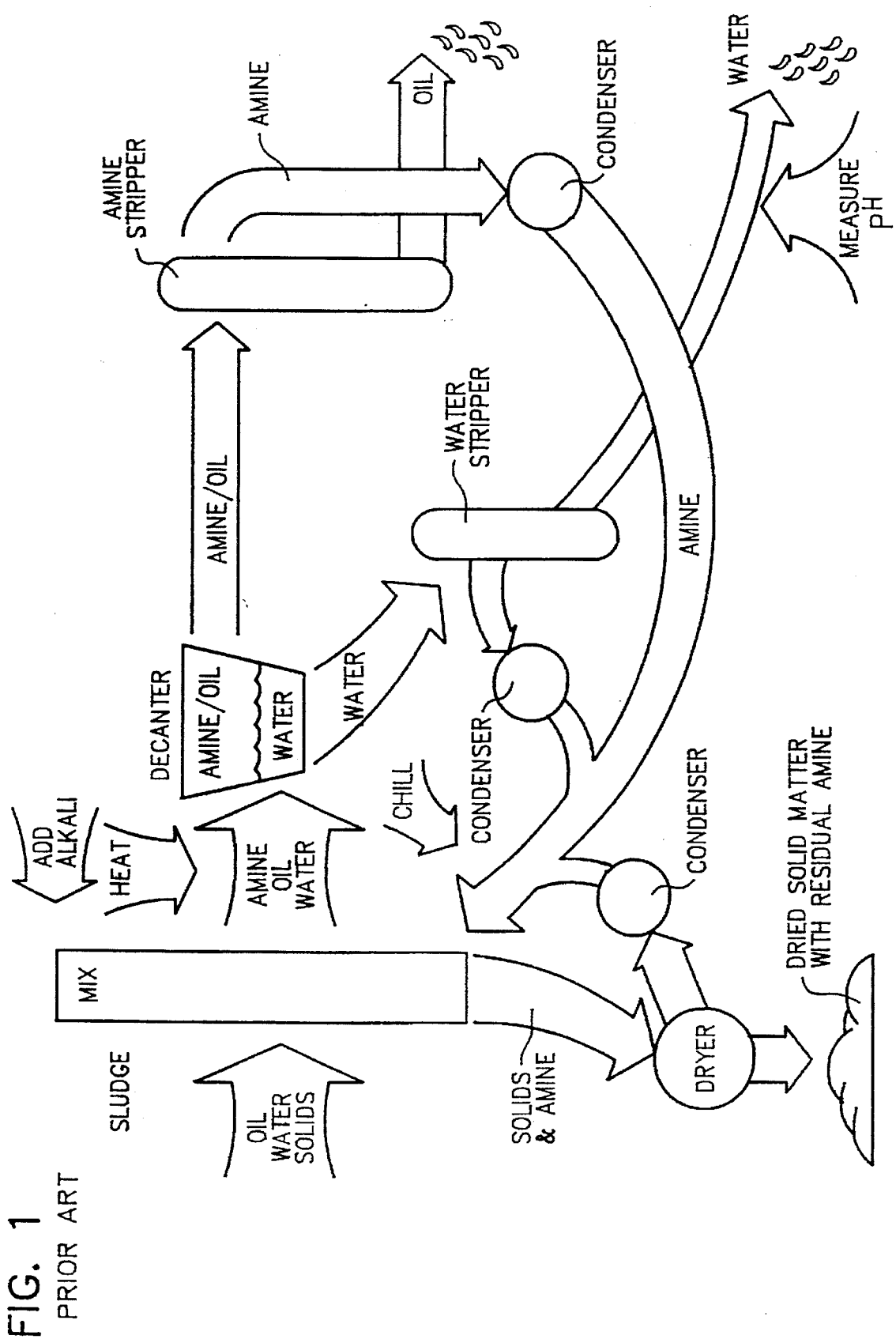
FIG. 1 is a schematic description of a prior art production of a solid matter containing residual oily or organic material containing matter (and amine) in the dewatering of a sludge containing oil or organic material, water and solids using an amine solvent having some but limited solvent capacity for water at a final temperature above 100° F. and having an inverse critical solution temperature with water. The technology used is based on the previously referenced Emanual '419, Ames '201, Peters '466, Nowak '754, and Nowak '153. An exemplar of the aforementioned amine solvents is triethylamine.
Figure 3:
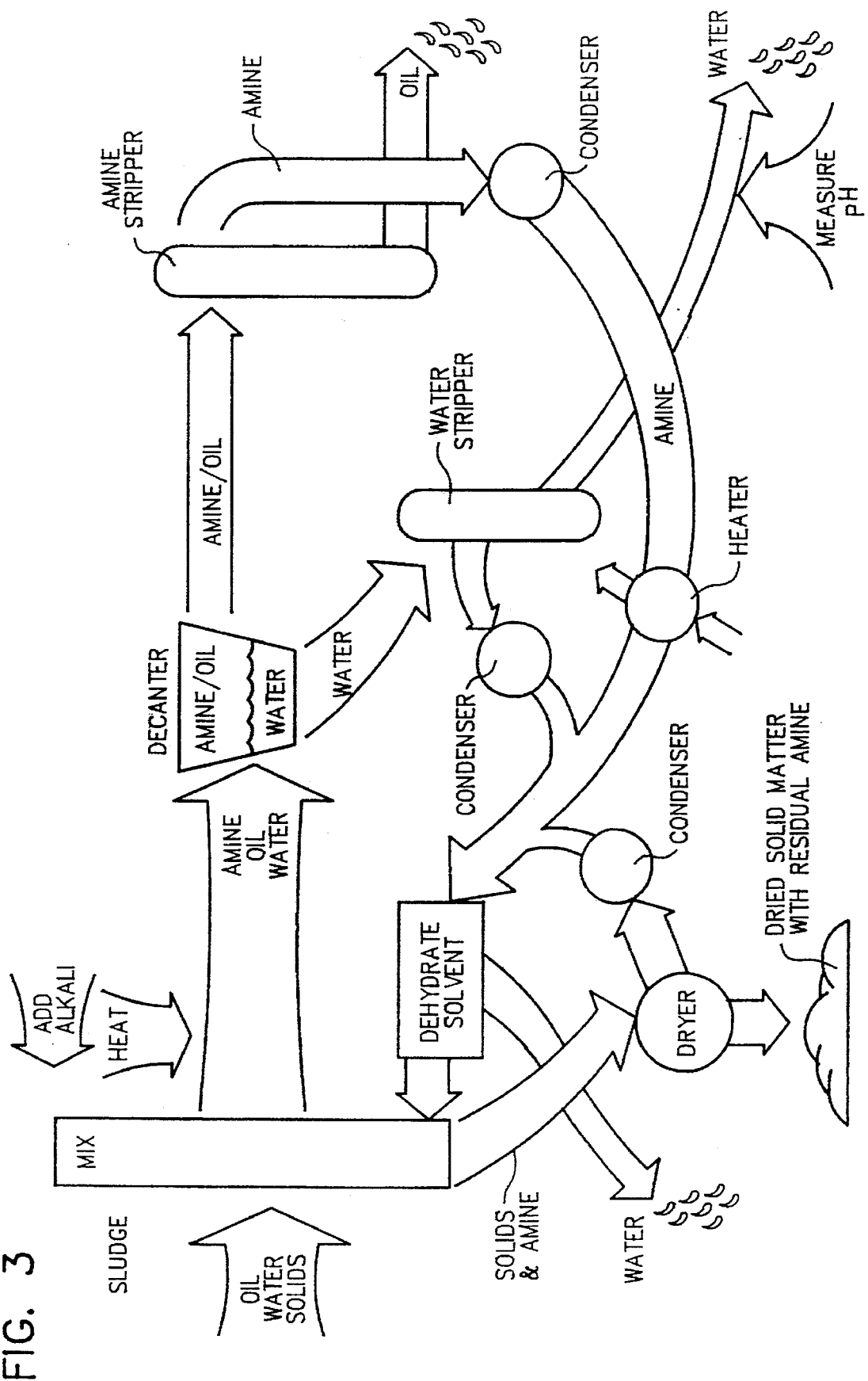
FIG. 3 is a schematic depiction of the present invention production of a solid matter containing a reduced content of oily or organic matter (when compared to the oily or organic matter content of the solid matter produced by the process of FIG. 1 and FIG. 2) and wherein agglomeration of the solid matter is prevented and settling of the solid matter can be controlled by utilizing dry amine solvent (such as triethylamine) for washing the solid matter rather than wet amine solvent as shown in FIG. 2 and by adding controlled amounts of water in the step of separation of solvent and solid.

This first embodiment of the present invention is shown schematically in FIG. 3 at point 3) where dry amine solvent 2) is added to and mixed with solid matter containing residual oil or organic matter 1). Agglomeration of the solids 1) in the mixing step 3 is prevented. The solid matter 1) could be the product of a prior practice solvent extraction, shown in FIG. 1, or could be a matter composition containing solids, oily or organic material, and water which had not previously been subjected to solvent extraction. Step 4) is a separation step where the solids and solvent are separated. Step 5) is a step where the separated solids are dried giving off solvent and water vapor mixed. The remaining process steps, except for 7), 16) and 17 represent prior practice and are not part of the present invention. Dry solvent, in this case amine, is recovered from the still after the water content of the still feed 8) and 10) is exhausted by removing the water-amine azeotrope 14). In the present invention, the dry solvent 16) is kept separate from the recovered azeotrope 14) and is reused 17) in the present invention at 2). [all triethylamine/water azeotrope is routed to the solvent decanter, then the water goes to the water stripper] The recovered azeotrope is reused in a FIG. 1 process or some other use. Such reuse is not part of the present invention.

Figure 2:
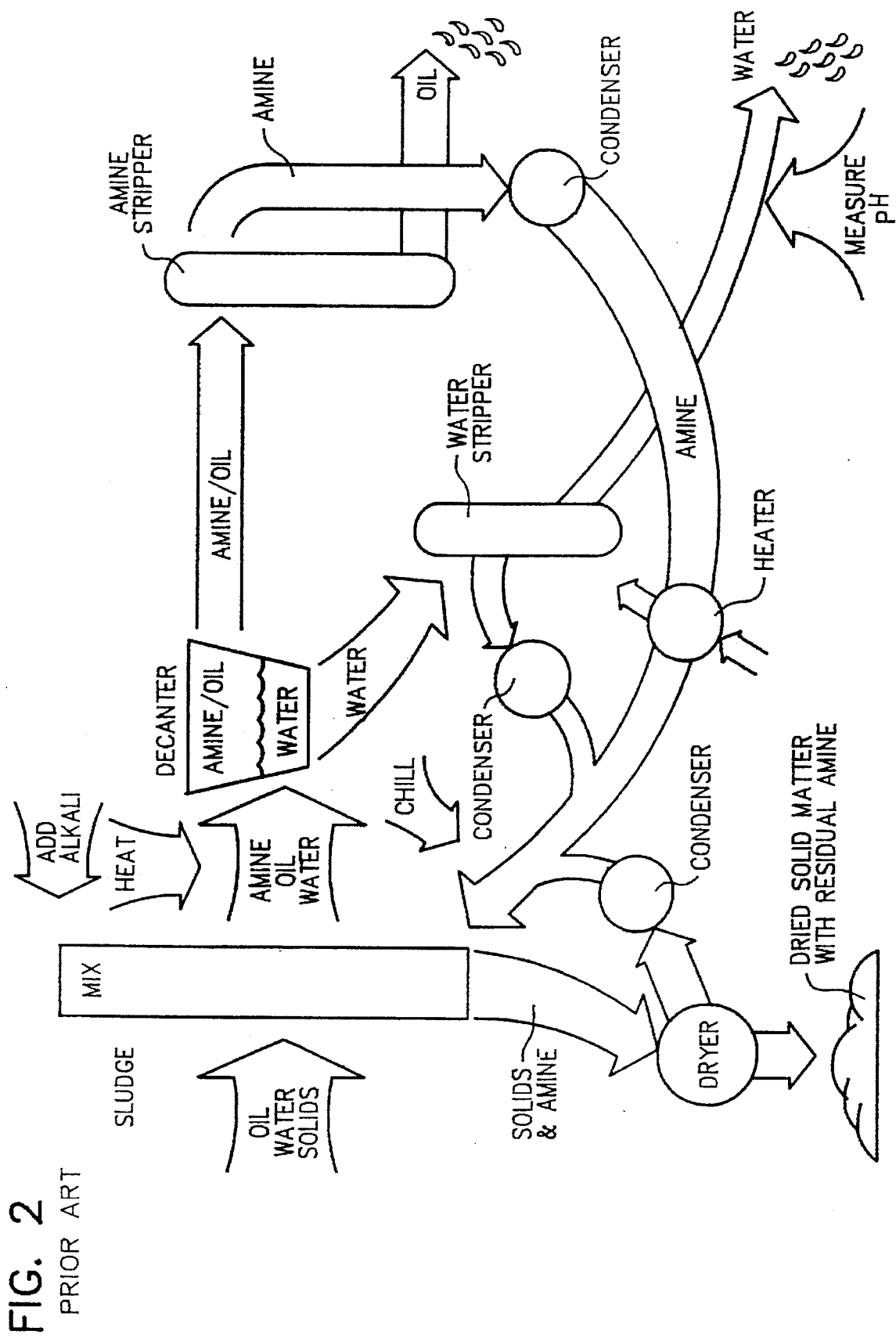
FIG. 2 is a schematic depiction of a prior art production of a solid matter containing a reduced content of oily or organic matter (when compared to the oily or organic matter content of the solid matter produced by the process of FIG. 1) by washing the solid matter produced in a FIG. 1 process with a recycled solvent having some but limited solvent capacity for water at 100° F. or above, and having an inverse critical solution temperature with water. With some types of solids, especially clay or clay containing or clay-like solids, agglomeration of the solids occurs leading to difficulty in mixing and handling, increased power consumption, increased equipment strength requirements, and decreased organic material extraction.

Note the difference from prior practice shown schematically in FIG. 2. In the prior practice of FIG. 2, no dry solvent (amine) is used nor is any dry solvent recovered from the still. Instead, wet solvent (in this case amine) 2) is mixed with the solids 1) to form a wet solvent-solids mixture 3). Agglomeration of solids is not prevented. Note also that only azeotrope 14) is recovered from the still for reuse. Any dry solvent formed in the still is mixed with the azeotrope and lost as far as reuse as dry solvent is concerned.

The present invention also discloses in a second embodiment a process for control of solids settling during the solids-solvent separation step following mixing of the solids with dry solvent and for control of solids dusting in the drying step following the solids-solvent separation step. This embodiment of the present invention is shown in FIG. 3 where water 7) is added to the mixture of solids 1) and dry solvent 2) in the separation step 4). According to the practice of the present invention the solids were rendered non-agglomerating and were hot solvent extracted by mixing with dry hot solvent at step 3) of FIG. 3. Separation of these non-agglomerating solids from the hot solvent at Step 4) of FIG. 3 may now be difficult. Accordingly, water 7) is added to the separator in appropriate amounts to cause agglomeration to the extent necessary for the ease of separation desired.

In addition adequate amounts of water 7) can be added to the separation device 4) such that dusting of solids in the subsequent drying step 5) is held to acceptable levels.

EXAMPLE 1

A sample of soil consisting of a mixture of clay, loam, and sand and containing solids (91%), water (7.1%), and oil and grease (2.4%) and containing 20,000 ppm of polychlorinated biphenyls (PCB) was solvent extracted and the concentration of PCB remaining after each extraction step measured. Triethylamine was used as the solvent.

| Extraction Step | Solvent Condition | PCB Remaining ppm | Observation |
|---|---|---|---|
| 1 | Cold triethylamine (<60° F.) | 1,100 | mixes to uniform suspension |
| 2 | Hot, wet triethylamine (140° F., 2% H$_2$O) | 190 | solid forms gooey mass sticks to wall |
| 3 | Hot, wet triethylamine | 83 | solid forms gooey mass sticks to wall |
| 4 | Hot, wet triethylamine | 210 | solid forms gooey mass sticks to wall |
| 5 | Hot, wet triethylamine | 92 | solid forms gooey mass sticks to wall |
| 6 | Hot, wet triethylamine | 73–100 | solid forms gooey mass sticks to wall |
| 7 | Hot, dry triethylamine (140° F., 0.2% H$_2$O) | 150 | gooey mass breaks up to fine particles |
| 8 | Hot, dry triethylamine (140° F., 0.2% H$_2$O) | 46 | fine particles |
| 9 | Hot, dry triethylamine (140° F., 0.2% H$_2$O) | 34 | fine particles |

This example illustrates agglomeration of solids when hot (140° F.), wet (2% water) triethylamine is used for extraction, and how use of hot, dry triethylamine overcomes agglomeration of solids. Also illustrated is the increase in Extraction efficiency using hot, dry triethylamine rather than hot, wet triethylamine.

EXAMPLE 2

A sediment sample with a high oil and grease (2.0%), and clay content containing solids (51%), water content (47%)

and 670 ppm of polychlorinated biphenyls (PCB) was solvent extracted and the concentration of PCB remaining after each extraction step measured. Triethylamine was used as the solvent.

| Extraction Step | Solvent Condition | PCB Remaining ppm | Observation |
|---|---|---|---|
| 1 | Cold triethylamine (<60° F., 2% H₂O) | 72 | mixes to uniform suspension |
| 2 | Hot, wet triethylamine (140° F., 2% H₂O) | 9.1 | severe agglomeration large spheres, adheres to walls |
| 3 | Hot, wet triethylamine (140° F., 2% H₂O) | 2.7 | severe agglomeration large spheres, adheres to walls |
| 4 | Hot, wet triethylamine (140° F., 2% H₂O) | 1.5 | similar to step 3, solids very heavy, doesn't want to stay suspended |
| 5 | Hot, wet triethylamine (140° F., 2% H₂O) | 1.3 | No water at first, mixing difficult. Added water after 2 min solids adhere to wall |
| 6 | Hot, wet triethylamine (140° F., 2% H₂O) | 1.2 | wet triethylamine. Solids adhere to wall |
| 7 | Hot, wet triethylamine (140° F., 2% H₂O) | 0.9 | wet triethylamine. Solids adhere to wall |
| 8 | Hot, wet triethylamine (140° F., 2% H₂O) | 1.0 | wet triethylamine. Solids adhere to wall |
| 9 | Hot, dry triethylamine (140° F., 0.2% H₂O) | 0.5 | Solid balls begin to break up to fine particles |
| 10 | Hot, drytriethylamine (140° F., 0.2% H₂O) | 0.5 | All solid balls break up to fine particles |

This example illustrates the agglomeration of solids when using hot (140° F.), wet (2% water) triethylamine for extraction and how use of hot, dry triethylamine overcomes agglomeration of solids. Also illustrated is improvement in extraction efficiency when using hot, dry triethylamine as opposed to using hot, wet triethylamine.

EXAMPLE 3

A high water content clay sample containing 390 PPM of toxaphene (a pesticide) was solvent extracted and the concentration of toxaphene remaining after each extraction step measured. Triethylamine was used as the solvent.

| Extraction Step | Solvent Condition | Toxaphene Remaining | Observation |
|---|---|---|---|
| 1 | Cold triethylamine (<60° F.) | 240 | Mixes to a uniform suspension |
| 2 | Hot, wet triethylamine (140° F., 2% H₂O) | 120 | Mixes to a uniform suspension |
| 3 | Hot, wet triethylamine (140° F., 2% H₂O) | 200 | Mixes to a uniform suspension |
| 4 | Hot, drytriethylamine (140° F., 0.2% H₂O) | 9 | Mixes to a uniform suspension |
| 5 | Hot, dry triethylamine (140° F., 0.2% H₂O) | 8 | Mixes to a uniform suspension |
| 6 | Hot, dry triethylamine (140° F., 0.2% H₂O) | 3 | Mixes to a uniform suspension |

This example illustrates a dramatic improvement in extraction efficiency when using hot, dry triethylamine as opposed to using hot (140° F.), wet (2% water) triethylamine even though agglomeration is not a problem with this sample.

EXAMPLE 4

A sample of soil consisting of mixture of clay, loam and sand containing oil and grease (0.25%), water (14%), and solids (86%), and PCB (1,100 ppm) was solvent extracted, and observations were recorded after each extraction step regarding mixing, particle agglomeration, settling, and other salient factors. The content of organic matter was not recorded at each stage. Triethylamine was used as the solvent.

| Extraction Step | Solvent Condition | Observations |
|---|---|---|
| 1 | Cold triethylamine (<60° F.) | Mixes easily and well. Settles cleanly but not very far. |
| 2 | Hot, wet triethylamine (140° F. 2% H₂O) | Mixes easily, small spheres. beginning to form. Settles quickly. |
| 3a | Hot, Dry triethylamine (140° F., 0.2% H₂O) | Spheres breaking up. A good amount of fine particles formed. |
| 3b | Water added )2% of triethylamine volume) | All fine particles immediately settled |

This example illustrates agglomeration of solids when using hot (140° F.), wet (2% water) triethylamine for extraction; prevention of agglomeration by using hot, dry triethylamine; increase in settling time using hot, dry triethylamine, and use of water addition to reduce and control settling time.

EXAMPLE 5

A oil sample consisting of a mixture of clay, (19%), loam and sand containing oil and grease (0.40%), water (19%), solids (81%) and PCB (100 ppm) was solvent extracted and observations were recorded regarding mixing, particle agglomeration, settling and other salient factors. The content or organic matter was noted and recorded at each stage. Triethylamine was used as the solvent.

| Extraction Step | Solvent Condition | Observations |
|---|---|---|
| 1 | Cold triethylamine (<60° F.) | Mixes uniformly and easily |
| 2 | Hot, wet triethylamine (140° F., 2% H₂O) | Mixes easily |
| 3 | Hot, wet triethylamine 140° F., 2% H₂O) | Mixes easily. Spheres beginning to form. |
| 4 | Hot, wet triethylamine 140° F., 2% H₂O) | Mixes easily but a little more difficult than step 3. Settles quickly. Spheres now evident. |
| 5 | Hot, wet triethylamine 140° F., 2% H₂O) | Mixes the same. Spheres larger |
| 6a | Hot, dry triethylamine 140° F., 0.2% H₂O) | After 10 min mixing, spheres broken down and fines present. Settles much more slowly. Solids do not adhere to sides. |
| 6b | Add water (2% of triethylamine volume) | Spheres form and settles immediately. After 10 min mixing, solids begin to adhere to sides. |

This example illustrates agglomeration of solids when using hot (140° F.), wet (2% water) triethylamine for extraction; prevention or overcoming of agglomeration when using hot, dry triethylamine; increase in settling time when using hot, dry triethylamine; use of water addition to reduce and control settling time; adherence of solids to container walls (or sides) when using hot, wet triethylamine; and use of hot, dry triethylamine to cause solids to not adhere to container walls.

From the foregoing it will be appreciated that, although embodiments of the invention have been described herein for purposes of illustration, various modifications may be made without deviating from the spirit and scope of the invention. Accordingly, the invention is not limited except as by the appended claims. In particular, this invention is applicable to the removal of lewisite, nerve agent, and mustard compounds from contaminated samples.

We claim:

1. A process for solvent extraction of contaminated material wherein said contaminated material comprises a mixture of solid material, water, and organic material which is to be removed from said contaminated material, said method comprising the steps of:

(1) calculating the amount of solvent which will absorb substantially all water in said contaminated material, taking into account the solvent capacity for water at a temperature at which the solvent is to be mixed with said contaminated materials, and the water content of said contaminated material;

(2) measuring and dispensing for use the amount of said solvent calculated in step (1);

(3) mixing said contaminated material and said solvent at said temperature;

(4) dissolving a portion of said organic material in said solvent;

(5) separating said solvent from the solid material to thereby at least partially decontaminate said sold material; and (6) wherein, prior to or during mixing said solvent with said contaminated material, (a) the temperature of the solvent is adjusted to said temperature, said preselected temperature being above the inverse critical solution temperature of said solvent for water, if said inverse critical solution temperature exists, and (b) wherein said solvent has at least a limited solution capacity for water at said temperature of said solvent, and (c) wherein said solvent is substantially free of water, (7) so that agglomeration of said solid material is hindered or prevented.

2. The process of claim 1 wherein said the step of adjusting the temperature of said solvent comprises heating said solvent to at least 100° F.

3. The process of claim 2, wherein the step of adjusting the temperature of said solvent comprises heating said solvent to at least 130° F.

4. The process of claim 1 wherein said solvent possesses a solvent capacity for water at said temperature of ½% to 15% by weight.

5. The process of claim 4, wherein said solvent possesses a solvent capacity for water at said temperature of 1% to 5% by weight.

6. The process of claim 1 wherein said solvent is selected from the group consisting of secondary or tertiary amines, said amines having the general molecular formula

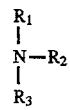

wherein,

R₁ is hydrogen or alkyl radical and R₂ and R₃ are alkyl radicals having from one to six carbon atoms or alkenyl radicals having from two to six carbon atoms and the total number of carbon atoms in the molecule being in the range of three to seven inclusive, said amine having an inverse critical solution temperature in a two phase system with water.

7. The process of claim 1 wherein said solvent is triethylamine.

8. The process of claim 1 wherein the water content of said solvent during mixing does not exceed 0.2% by weight.

9. The process of claim 1 wherein said contaminated material comprises a mixture of soil and water including organic material which is to be removed from said mixture.

10. The process of claim 9 wherein said soil, which is a component of said contaminated material, comprises a mixture of clay, loam, and sand.

11. The process of claim 1, wherein an additional step (4b) is performed following step (4) and prior to step (5), said step (4b) comprising:

(4b) adding water to the mixture of said solvent and said contaminated material in an amount effective to cause said solid material to settle.

12. The process of claim 11, wherein the step of adjusting the temperature of said solvent comprises heating said solvent to at least 100° F.

13. The process of claim 11 wherein said solvent is triethylamine.

14. The process of claim 11 wherein the water content of said solvent during mixing does not exceed 0.2% by weight.

15. The process of claim 11 wherein said contaminated material comprises a mixture of soil and water, and wherein said contaminated material further comprises organic material which is to be removed from said contaminated material.

16. The process of claim 15 wherein said soil comprises a mixture of clay, loam and sand.

17. The process of claim 11, wherein the step of adjusting the temperature of said solvent comprises heating said solvent to at least 130° F.

18. A process for extraction of organic material from contaminated material, wherein said contaminated material comprises a mixture of solid material, water, and organic material, said method comprising the steps of:

(1) mixing the contaminated material and the solvent to provide a resulting mixture of solvent and contaminated material at a preselected temperature;

(2a) dissolving a portion of said organic material in said solvent, to thereby at least partially decontaminate said contaminated material;

(2b) adding water to said mixture of said solvent and contaminated material in an amount effective to cause said solid material to settle;

(3) separating said solvent from said solid material;

(4) wherein, prior to or during the step of mixing said solvent with said contaminated material, the temperature of said solvent is adjusted to said preselected temperature, said preselected temperature being above the inverse critical solution temperature of said solvent for water, if said inverse critical solution temperature exists, and (5) and wherein, during mixing of said solvent with said contaminated material, the actual amount of water in said solvent at the preselected mixing temperature is maintained approximately 1.5% by weight below the capacity of the solvent for water, (6) so that organic material is effectively removed from said contaminated material.

19. The process of claim 18, wherein the step of adjusting the temperature of said solvent comprises heating said solvent to at least 100° F.

20. The process of claim 18 wherein said solvent is triethylamine.

21. The process of claim 18 wherein the water content of said solvent during mixing does not exceed 0.2% by weight.

22. The process of claim 18 wherein said contaminated material comprises a mixture of soil and water, including organic material which is to removed from said mixture.

23. The process of claim 22 wherein said soil comprises a mixture of clay, loam and sand.

24. The process of claim 18, wherein the step of adjusting the temperature of said solvent comprises heating said solvent to at least 130° F.

* * * * *